United States Patent
Wang

(10) Patent No.: US 11,223,961 B2
(45) Date of Patent: Jan. 11, 2022

(54) CONFIGURATION METHOD OF WIRELESS NETWORK SYSTEM, CONFIGURATION TERMINAL AND CONFIGURATION SYSTEM

(71) Applicant: OPPLE LIGHTING CO., LTD., Shanghai (CN)

(72) Inventor: Zhi Wang, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 178 days.

(21) Appl. No.: 16/665,129

(22) Filed: Oct. 28, 2019

(65) Prior Publication Data

US 2020/0059798 A1    Feb. 20, 2020

Related U.S. Application Data

(63) Continuation of application No. PCT/CN2018/081621, filed on Apr. 2, 2018.

(30) Foreign Application Priority Data

Apr. 28, 2017    (CN) .......................... 201710297411.5
Apr. 28, 2017    (CN) .......................... 201720466738.6

(51) Int. Cl.
*H04W 16/20*    (2009.01)
*G06F 9/455*    (2018.01)
*H04L 12/24*    (2006.01)

(52) U.S. Cl.
CPC ........ *H04W 16/20* (2013.01); *G06F 9/45558* (2013.01); *H04L 41/0813* (2013.01); *H04L 41/0893* (2013.01); *G06F 2009/45595* (2013.01)

(58) Field of Classification Search
None
See application file for complete search history.

(56) References Cited

U.S. PATENT DOCUMENTS 8,665,762 B2 *   3/2014   Knibbe ................... H04L 67/18
                                                    370/282
10,819,618 B1 *  10/2020  Wada .................... H04L 41/145
(Continued)

FOREIGN PATENT DOCUMENTS

CN    104137480 A    11/2014
CN    105490898 A    4/2016
(Continued)

OTHER PUBLICATIONS

International Search Report (including Engish translation) and Written Opinion issued in PCT/CN2018/081621, dated Jun. 11, 2018, 9 pages.

(Continued)

*Primary Examiner* — Ayaz R Sheikh
*Assistant Examiner* — Faiyazkhan Ghafoerkhan
(74) *Attorney, Agent, or Firm* — Arch & Lake LLP

(57) ABSTRACT

A method for configuring a wireless network system, and a terminal are provided. The method includes: collecting relevant information of respective equipment nodes in a wireless network system to be configured; determining network configuration parameters of virtual nodes corresponding to the respective equipment nodes based on the relevant information of the respective equipment nodes, and constructing a virtual network system including the virtual nodes corresponding to the respective equipment nodes; and performing a network configuration on the respective equipment nodes in the wireless network system to be configured by using the constructed virtual network system.

19 Claims, 4 Drawing Sheets

(56) References Cited

U.S. PATENT DOCUMENTS

| | | | | |
|---|---|---|---|---|
| 10,979,394 | B2* | 4/2021 | Takajo | H04L 63/0272 |
| 2010/0214948 | A1* | 8/2010 | Knibbe | H04L 67/18 |
| | | | | 370/254 |
| 2013/0132546 | A1* | 5/2013 | Vicat-Blanc Primet | ...... |
| | | | | H04L 41/02 |
| | | | | 709/223 |
| 2013/0163606 | A1* | 6/2013 | Bagepalli | H04L 49/356 |
| | | | | 370/409 |
| 2014/0123140 | A1* | 5/2014 | Motoki | H04L 41/0806 |
| | | | | 718/1 |
| 2019/0058695 | A1* | 2/2019 | Takajo | H04L 12/4633 |
| 2021/0120437 | A1* | 4/2021 | Rosenschild | H04W 24/04 |

FOREIGN PATENT DOCUMENTS

| | | | |
|---|---|---|---|
| CN | 107248925 A | 10/2017 | |
| CN | 206894660 U | 1/2018 | |

OTHER PUBLICATIONS

Chinese First Office Action (including English translation) issued in CN201710297411.5, dated Apr. 24, 2019, 7 pages.

* cited by examiner

CONFIGURATION METHOD OF WIRELESS NETWORK SYSTEM, CONFIGURATION TERMINAL AND CONFIGURATION SYSTEM

CROSS-REFERENCE TO RELATED APPLICATIONS

This application is based upon and claims the priority of PCT patent application No. PCT/CN2018/081621 filed on Apr. 2, 2018 which claims the priority of Chinese Patent Application No. 201710297411.5 filed on Apr. 28, 2017, and Chinese Patent Application No. 201720466738.6 filed on Apr. 28, 2017, the entire content of all of which is hereby incorporated by reference herein for all purposes.

TECHNICAL FIELD

Examples of the present disclosure relates to a technical field of Internet of Things application, in particular to a method for configuring a wireless network system, a configuration terminal and a configuration system.

BACKGROUND

In a configuration process of a commercial lighting wireless network system, because a network structure covers a plurality of areas on one floor, even a plurality of floors, with a large number of nodes, how to efficiently complete a structure and configuration of a wireless network on site is very important for saving time and cost and delivering products with high quality.

SUMMARY

The present disclosure provides a configuration method, a terminal for configuring a wireless network system offline, and a terminal for configuring a wireless network system on site.

According to a first aspect of the present disclosure, a method for configuring a wireless network system is provided, which includes: collecting relevant information of respective equipment nodes in a wireless network system to be configured; determining network configuration parameters of virtual nodes corresponding to the respective equipment nodes based on the relevant information of the respective equipment nodes, and constructing a virtual network system comprising the virtual nodes corresponding to the respective equipment nodes; and performing a network configuration on the respective equipment nodes in the wireless network system to be configured by using the constructed virtual network system.

According to a second aspect, a terminal for configuring a wireless network system offline is provided. The terminal may include a processor; and a memory, on which a computer program is stored and is executable by the processor. The computer program, when is executed, may cause the processor to perform: collecting relevant information of respective equipment nodes in a wireless network system to be configured; determining network configuration parameters of virtual nodes corresponding to the respective equipment nodes based on the relevant information of the respective equipment nodes, and constructing a virtual network system including the virtual nodes corresponding to the respective equipment nodes; storing a configuration file of the constructed virtual network system, where the configuration file of the virtual network system may include respective virtual nodes of the virtual network system and network configuration parameters of the respective virtual nodes; and sending the configuration file of the virtual network system to a terminal used for configuration on site, so that the terminal used for the configuration on site uses the configuration file of the virtual network system to perform the network configuration on the respective equipment nodes in the wireless network system to be configured.

According to a third aspect, a terminal for configuring a wireless network system on site is provided. The terminal may include a receiver, configured to receive the configuration file of the virtual network system transmitted from a terminal for configuring the wireless network system offline comprising an offline terminal processor; and an offline terminal memory, on which an offline terminal computer program is stored and is executable by the offline terminal processor.

The offline terminal computer program, when is executed, causes the offline terminal processor to perform: collecting relevant information of respective equipment nodes in a wireless network system to be configured; determining network configuration parameters of virtual nodes corresponding to the respective equipment nodes based on the relevant information of the respective equipment nodes, and constructing a virtual network system including the virtual nodes corresponding to the respective equipment nodes; storing a configuration file of the constructed virtual network system, where the configuration file of the virtual network system may include respective virtual nodes of the virtual network system and network configuration parameters of the respective virtual nodes; and sending the configuration file of the virtual network system to a terminal used for configuration on site, so that the terminal used for the configuration on site uses the configuration file of the virtual network system to perform the network configuration on the respective equipment nodes in the wireless network system to be configured.

The terminal may also include a processor; and a memory, on which a computer program is stored, where the computer program, when is executed, may cause the processor to perform: performing a network configuration on the respective equipment nodes in the wireless network system to be configured by using the configuration file of the virtual network system.

It is to be understood that both the foregoing general description and the following detailed description are exemplary and explanatory only and are not restrictive of the present disclosure.

BRIEF DESCRIPTION OF THE DRAWINGS

In order to clearly illustrate the technical solutions of the examples of the present disclosure or the technical solutions, the drawings needed in the description of the examples will be briefly described in the following; it is obvious that the following described drawings are only some examples described in the present disclosure. For those skilled in the art, other drawings can be obtained according to these drawings without creative labor.

DETAILED DESCRIPTION

In order to make objects, technical solutions and advantages of the present disclosure clearer, the technical solutions of the present disclosure will be described in a clearly and fully understandable way in connection with the examples of the present disclosure and the corresponding drawings. Apparently, the described examples are just a part but not all of the examples of the present disclosure. Based on the examples of the present disclosure, those skilled in the art can obtain other example(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

A method may be developed such that the installation personnel performs manual configuration and performs debugging on site according to a design drawing of a wireless system and a detailed configuration drawing of the wireless system. This method is inefficient and requires high skills of the installation personnel, so the problem exists.

Figure 1:
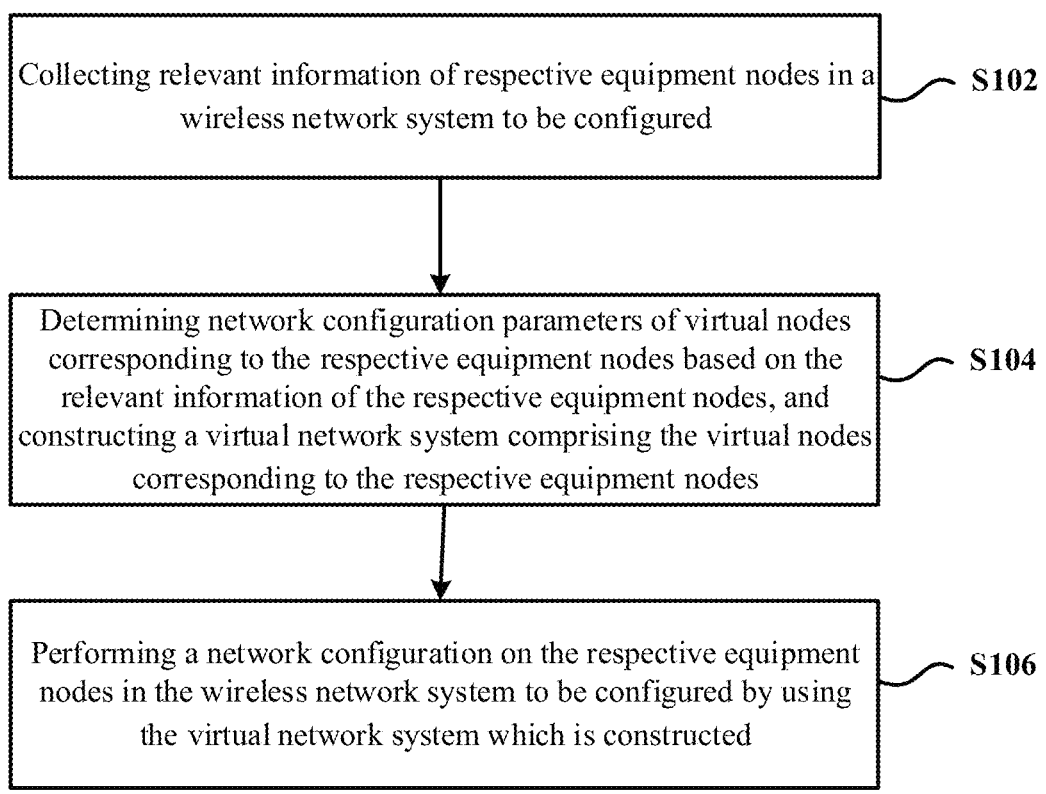
FIG. 1 shows a flowchart of a method for configuring a wireless network system according to an example of the present disclosure.

In order to solve this problem, an example of the present disclosure provides a method for configuring a wireless network system. FIG. 1 shows a flow chart of a method for configuring a wireless network system according to an example of the present disclosure. Referring to FIG. 1, the method may at least include steps S102 to S106.

S102: collecting relevant information of respective equipment nodes in a wireless network system to be configured.

In this step, the respective equipment nodes in the wireless network system to be configured are some intelligent equipment, which includes a wireless communication module and a control module. The wireless communication module is used for receiving external control signals, and the control module is used for controlling a turn-on of the intelligent equipment, a turn-off of the intelligent equipment and adjusting equipment parameters of the intelligent equipment according to the control signals received by the wireless communication module. The wireless communication module herein includes but are not limited to: Wireless Fidelity (WiFi), Bluetooth, ZigBee, and the like.

In practical applications, the above-mentioned intelligent equipment can be, for example, intelligent lighting devices, smart cameras, air purifiers, and the like, and the present disclosure is not limited thereto.

S104: determining network configuration parameters of virtual nodes corresponding to the respective equipment nodes based on the relevant information of the respective equipment nodes, and constructing a virtual network system comprising the virtual nodes corresponding to the respective equipment nodes.

S106: performing a network configuration on the respective equipment nodes in the wireless network system to be configured by using the constructed virtual network system.

In the example of the present disclosure, firstly, the relevant information of the respective equipment nodes in the wireless network system to be configured is collected; then, based on the relevant information of the respective equipment nodes, the network configuration parameters of the virtual nodes corresponding to the respective equipment nodes are determined, and the virtual network system including the virtual nodes corresponding to the respective equipment nodes is constructed; after that, the constructed virtual network system is used to perform the network configuration on the respective equipment nodes in the wireless network system to be configured. Thus, it can be seen that the example of the present disclosure performs the network configuration on the respective equipment nodes in the wireless network system to be configured by constructing the virtual network system.

Because the constructed virtual network system includes the virtual nodes corresponding to the respective equipment nodes and the respective virtual nodes is defined with network configuration parameters, in the configuration process on site, each equipment node is corresponding to a corresponding virtual node, and the network configuration parameters of the virtual node are written to the equipment node, thus completing network configuration on an entire wireless network system. Thus, on one hand, the efficiency of configuring nodes on site is improved, and the problem of low efficiency caused by the fact, that the installation personnel need to manually configure and debug nodes on site according to the design drawings of the wireless system and the detailed configuration drawings of the wireless system in other implementations, is solved; and on the other hand, the requirements on the skills of the installation personnel can be reduce and the operability is strong.

The relevant information of the respective equipment nodes in the wireless network system to be configured is collected in step S102 above. Examples of the present disclosure can be implemented in various ways, and will be described in detail below.

Mode 1 is a construction drawing based mode.

In mode 1, site layout drawings and installation location drawings of the respective equipment nodes in the wireless network system to be configured can be obtained, and the relevant information of the respective equipment nodes can be collected from the site layout drawings and the installation location drawings.

Mode 2 is a mode based on functions to be realized by the respective equipment nodes.

In mode 2, the functions to be realized by the respective equipment nodes in the wireless network system to be configured can be determined, so that the relevant information of the respective equipment nodes can be collected based on the functions to be realized by the respective equipment nodes.

The relevant information of the respective equipment nodes obtained in mode 1 and mode 2 may include one or more of the following: site installation location information, location grouping information, location scene information, and working status information in different time periods, and the like. Examples of the present disclosure are not limited thereto.

Taking the respective equipment nodes in the wireless network system to be configured as A, B, C, D, E, F, G, and H respectively as an example, the wireless network system needs to realize that the equipment nodes A and B are located in a conference room, the equipment nodes C, D, E, and F are located in an office area, the equipment nodes G and H are located in a corridor, and the equipment nodes G and H are in a turn-on state in a specified time interval and in a turn-off state in a rest of the time other than the specified time interval. The example of the present disclosure can collect the relevant information of the respective equipment nodes according to the above data, and the relevant information includes site installation location information, location grouping information, working state information in different time periods and the like of the respective equipment nodes. It should be noted that the list is only schematic and does not limit the present disclosure.

In an optional example of the present disclosure, before determining the network configuration parameters of the virtual nodes corresponding to the respective equipment nodes based on the relevant information of the respective equipment nodes in step S104, the example of the present disclosure may further includes assigning unique node numbers to the respective equipment nodes, and further generate corresponding virtual nodes based on the node numbers of the respective equipment nodes. In the above example, it can be seen that A, B, C, D, E, F, G, and H can be the unique node numbers assigned to the respective equipment nodes, and then A, B, C, D, E, F, G, and H can be respectively taken as the virtual nodes corresponding to the respective equipment nodes. Of course, this case is only an example and does not limit the present disclosure. For example, 1, 2, 3, 4, 5, 6, 7, and 8 may be used as the node numbers of the equipment nodes A, B, C, D, E, F, G, and H, respectively.

Further, in step S104, the network configuration parameters of the virtual nodes corresponding to the respective equipment nodes are determined based on the relevant information of the respective equipment nodes. The example of the present disclosure provides an optional scheme, in which one or more fields of the network configuration parameters can be determined, one or more fields are matched in relevant information of the respective equipment nodes to obtain field values corresponding to respective fields, and then the respective fields and the field values corresponding to the respective fields are taken as the network configuration parameters of the virtual nodes corresponding to the respective equipment nodes. Here, the determined one or more fields may be, for example, ID, Groups, Scenes, Floor info, and the like. However, examples of the present disclosure are not limited thereto.

In order to ensure that the constructed virtual network system can realize all the design functions, the example of the present disclosure can also include acquiring a design function to be realized by the wireless network system to be configured after constructing the virtual network system including the virtual nodes corresponding to the respective equipment nodes in step S104, and then simulating and test the virtual network system to determine whether the virtual network system can realize the design function to be realized by the wireless network system to be configured. In this way, on-site debugging time is also saved.

In an optional example of the present disclosure, the design function to be realized by the wireless network system to be configured includes design functions to be realized by the respective equipment nodes in the wireless network system to be configured, so that in a case where the virtual network system is simulated and tested, respective virtual nodes in the virtual network system can be simulated and tested.

Still referring to the above example, the respective equipment nodes in the wireless network system to be configured are respectively A, B, C, D, E, F, G, and H. The wireless network system is necessary to realize that the equipment nodes A and B are located in the conference room, the equipment nodes C, D, E, and F are located in the office area, the equipment nodes G and H are located in the corridor, and the equipment nodes G and H are in a turn-on state in the specified time interval, and in a turn-off state in the rest of the time other than the specified time interval. During simulation and testing, in a case where an interface, which controls the conference room, is triggered, it is determined whether a turn-on or turn-off of virtual nodes A and B corresponding to the equipment nodes can be controlled; in a case where the interface, which controls the office area, is triggered, it is determined whether a turn-on or turn-off of virtual nodes C, D, E, and F corresponding to the equipment nodes can be controlled; in a case where the interface, which controls the corridor, is triggered, it is determined whether a turn-on or turn-off of virtual nodes G and H corresponding to the equipment nodes can be controlled; in a case where a current time is controlled in the specified time interval, it is determined whether the virtual nodes G and H corresponding to the equipment nodes are turned on; and in a case where the current time is controlled in the rest of the time, it is determined whether the virtual nodes G and H corresponding to the equipment nodes are turned off.

In an optional example of the present disclosure, in the above step S106, network configuration may be performed on the respective equipment nodes in the wireless network system to be configured by using the constructed virtual network system. The example of the present disclosure provides an optional scheme, in which a configuration file of the constructed virtual network system can be stored, and the configuration file of the virtual network system includes the respective virtual nodes of the virtual network system and network configuration parameters of the respective virtual nodes. Furthermore, the network configuration parameters of the respective virtual nodes are extracted from the configuration file of the virtual network system, and are written into corresponding respective equipment nodes in the wireless network system to be configured to perform the network configuration on the respective equipment nodes.

Furthermore, in order to be able to display the respective virtual nodes and the parameter information of the respective virtual nodes more intuitively and clearly, the example of the present disclosure can generate a display interface including the respective virtual nodes in the virtual network system, according to the configuration file of the virtual network system, for displaying to a user, so that in a case where a trigger operation of the user for respective virtual nodes in the display interface is received, the network configuration parameters of the respective virtual nodes are extracted from the configuration file of the virtual network system. As can be seen, the display interface generated by the example of the present disclosure can more intuitively and clearly display the respective virtual nodes and the parameter information thereof, so that the installation personnel can quickly acquire the virtual nodes corresponding to the respective equipment nodes on site and write the network configuration parameters of the virtual nodes into the equipment nodes, thereby completing the network configuration of the entire wireless network system and further improving the efficiency of configuring the node on site.

As described above, the respective equipment nodes in the wireless network system to be configured are intelligent equipment, which includes the wireless communication module and the control module, the wireless communication module is used for receiving the external control signals, and the control module is used for controlling the turn-on of the intelligent equipment, the turn-off of the intelligent equipment and adjusting equipment parameters of the intelligent equipment according to the control signals received by the wireless communication module. Therefore, in the example of the present disclosure, in a case where the network configuration parameters of the respective virtual nodes in the virtual network system are written into corresponding respective equipment nodes in the wireless network system to be configured, the network configuration parameters of the respective virtual nodes in the virtual network system can be sent to a wireless communication module with a same protocol type on the corresponding respective equipment nodes, so that the network configuration parameters of the respective virtual nodes in the virtual network system are written into the corresponding respective equipment nodes in the wireless network system to be configured. In this way, the wireless network system can be configured for the respective equipment nodes according to the network configuration parameters.

In an optional example, the method for configuring the wireless network system provided by the example of the present disclosure can be applied to an independent terminal device, that is, the independent terminal device may construct the virtual network system including the virtual nodes corresponding to the respective equipment nodes, store the configuration file of the constructed virtual network system, extract the network configuration parameters of the respective virtual nodes from the configuration file of the virtual network system, and write the network configuration parameters into the corresponding respective device nodes in the wireless network system to be configured to perform network configuration on the respective equipment nodes. Optionally, the display interface including the respective virtual nodes in the virtual network system can be generated on the independent terminal device according to the configuration file of the virtual network system to be displayed to the user, and further, in a case where a trigger operation of the user for the respective virtual node in the display interface is received, the network configuration parameters of the respective virtual nodes are extracted from the configuration file of the virtual network system. Furthermore, the wireless communication module on the independent terminal device sends the network configuration parameters of the respective virtual nodes in the virtual network system to the wireless communication module with a same protocol type on the corresponding respective equipment nodes, thereby writing the network configuration parameters of the respective virtual nodes in the virtual network system into the corresponding respective equipment nodes in the wireless network system to be configured.

In another optional example, the method for configuring the wireless network system provided by the example of the present disclosure can be applied to a first terminal used for offline configuration, such as a personal computer, a server, and the like. In the above-mentioned step S106, the constructed virtual network system is used to perform the network configuration on the respective equipment nodes in the wireless network system to be configured. The example of the present disclosure can be implemented as follows: firstly, the configuration file of the constructed virtual network system is stored on the first terminal, then, the first terminal sends the configuration file of the virtual network system to a second terminal used for configuration on site, so that the second terminal uses the configuration file of the virtual network system to perform the network configuration on the respective equipment nodes in the wireless network system to be configured. The second terminal here is used for configuration on site and may be some handheld terminals, such as smart phones, tablet computers, smart watches, and the like.

Further, in a case where the second terminal uses the configuration file of the virtual network system to perform the network configuration on the respective equipment nodes in the wireless network system to be configured, specifically, the second terminal extracts the network configuration parameters of the respective virtual nodes from the configuration file of the virtual network system and writes the network configuration parameters into the corresponding respective equipment nodes in the wireless network system to be configured to perform the network configuration on the respective equipment nodes.

In order to be able to display the respective virtual nodes and the parameter information of the respective virtual nodes more intuitively and clearly, the example of the present disclosure can generate a display interface including the respective virtual nodes in the virtual network system on the second terminal, according to the configuration file of the virtual network system, to display to the user, so that in a case where a trigger operation of the user for the respective virtual nodes in the display interface is received, the second terminal extracts the network configuration parameters of the respective virtual nodes from the configuration file of the virtual network system. As can be seen, the display interface generated by the example of the present disclosure can more intuitively and clearly display the respective virtual nodes and the parameter information thereof, so that the installation personnel can quickly acquire the virtual nodes corresponding to the respective equipment nodes on site and write the network configuration parameters of the virtual nodes into the equipment nodes, thereby completing the network configuration of the entire wireless network system and further improving the efficiency of configuring the node on site.

In a specific example, the display interface is generated on the second terminal, and the display interface may be one or more. The display interface may fill an entire display screen of the second terminal or may occupy part of the display screen of the second terminal. The example of the present disclosure is not limited to this case.

Still taking the above example as an example, the respective equipment nodes in the wireless network system to be configured are respectively A, B, C, D, E, F, G, and H. The equipment nodes A and B are located in the conference room, the equipment nodes C, D, E, and F are located in the office area, the equipment nodes G and H are located in the corridor, and the equipment nodes G and H are in a turn-on state in a specified time interval and in a turn-off state in the rest of the time other than the specified time interval. It can be seen that A, B, C, D, E, F, G, and H can be the unique node numbers assigned to the respective equipment nodes, and then A, B, C, D, E, F, G, and H can be respectively taken as the virtual nodes corresponding to the respective equipment nodes. After the first terminal constructs the virtual network system including virtual nodes A, B, C, D, E, F, G, and H, the first terminal stores the configuration file of the constructed virtual network system, and then the first terminal sends the configuration file of the virtual network system to the second terminal used for configuration on site. The second terminal generates the display interface including the respective virtual nodes in the virtual network system according to the configuration file of the virtual network system to display to the user. On the display interface, A, B, C, D, E, F, G, and H can be displayed on one display interface, or displayed in a plurality of display interfaces. For example, according to the site installation location of the respective equipment nodes corresponding to the virtual nodes, the display interface can be divided into three display interfaces. Each display interface can display the virtual nodes A and B of the conference room, the virtual nodes C, D, E, and F of the office area, and the virtual nodes G and H of the corridor respectively. Each display interface can be flexibly switched to facilitate the installation personnel to search on site. In practical application, in a case where the equipment nodes corresponding to the virtual nodes are distributed on different floors on site, the virtual nodes of different floors can be respectively displayed on each display interface when being displayed on a plurality of display interfaces. It should be noted that the examples herein are only schematic and do not limit the present disclosure.

The installation personnel on site can perform a trigger operation, such as clicking, long pressing, sliding, and the like, on a virtual node. At this time, the second terminal extracts network configuration parameters of the virtual node corresponding to the triggering operation from the configuration file of the virtual network system and writes the network configuration parameters into corresponding respective equipment nodes in the wireless network system to perform the network configuration for the respective equipment nodes.

As aforesaid, the respective equipment nodes in the wireless network system to be configured may be an intelligent equipment, which includes the wireless communication module and the control module, the wireless communication module is used for receiving the external control signals, and the control module is used for controlling the turn-on, turn-off and equipment parameters adjustments of the intelligent equipment, according to the control signals received by the wireless communication module. Therefore, in the example of the present disclosure, in a case where the network configuration parameters of the respective virtual nodes in the virtual network system are written into corresponding respective equipment nodes in the wireless network system to be configured by the second terminal, the network configuration parameters of the respective virtual nodes in the virtual network system can be sent to a wireless communication module with a same protocol type on corresponding respective equipment nodes by a wireless communication module on the second terminal, so that the network configuration parameters of the respective virtual nodes in the virtual network system are written into the corresponding respective equipment nodes in the wireless network system to be configured. In this way, the respective equipment nodes can configure the wireless network system according to the network configuration parameters.

After the configuration of the wireless network system is completed, control instructions or control signals can be sent to the respective equipment nodes by a remote controller or APP (application program). After a wireless communication module on an equipment node receives the control instructions or control signals, the control module determines whether to execute the control instructions according to the network configuration parameters on the equipment node. Specifically, the control module analyzes the control instructions or the control signals to obtain node numbers carried by the control instructions or the control signals, matches the analyzed node numbers with the node numbers in network configuration parameters of the equipment node, and determines to execute the control instructions in a case where the analyzed node numbers are matched with the node numbers in the network configuration parameters; and in a case where the analyzed node numbers are not matched with the node numbers in the network configuration parameters, the control module determines that the control instructions will not be executed.

Various implementations of each link of the example as shown in FIG. 1 are described above, and the implementation process of the method for configuring the wireless network system of the present disclosure will be described in detail below with reference to an example. In this example, the configuration of the wireless network system is performed for a commercial lighting device. In the site layout drawing as shown FIG. 2, the network structure covers multiple areas on one floor, and there may be a plurality of floors. A number of equipment nodes (i.e., lighting nodes) is large. The site installation of respective equipment nodes has been completed, and it is ready for the configuration of the wireless network system.

The method for configuring the wireless network system provided by the example of the present disclosure may include two parts: generation of an offline configuration file and offline configuration of the network, which will be respectively described in detail below.

(1) Generation of an Offline Configuration File

Firstly, the site layout drawings and installation location drawings of the respective equipment nodes in the wireless network system to be configured are obtained, and the relevant information of the respective equipment nodes is collected from the site layout drawings and installation location drawings. In addition, the functions to be realized by the respective equipment nodes in the wireless network system to be configured can also be determined so as to collect the relevant information of the respective equipment nodes based on the functions to be realized by the respective equipment nodes. Therefore, the obtained relevant information of the respective equipment nodes may include site installation location information, location grouping information, location scene information, working status information in different time periods, and the like.

Secondly, the respective equipment nodes are assigned with unique node numbers, and then corresponding virtual nodes are generated based on the node numbers of the respective equipment nodes.

Next, based on the relevant information of the respective equipment nodes, the network configuration parameters of the virtual nodes corresponding to the respective equipment nodes are determined, and the virtual network system including the virtual nodes corresponding to the respective equipment nodes is constructed. Specifically, one or more fields of the network configuration parameters can be determined, one or more fields are matched in relevant information of the respective equipment nodes to obtain field values corresponding to the respective fields, and then the respective fields and field values corresponding to the respective fields are taken as the network configuration parameters of the virtual nodes corresponding to the respective equipment nodes. Here, the determined one or more fields may be, for example, ID, Groups, Scenes, Floor info, and the like. However, the examples of the present disclosure are not limited thereto.

Figure 2:
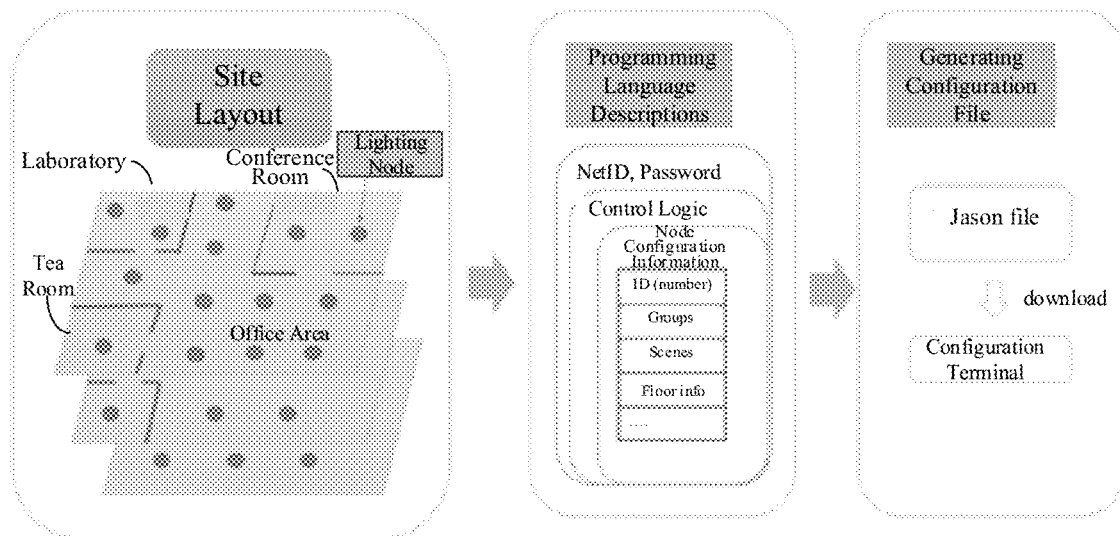
FIG. 2 shows a flowchart of generating a configuration file of a virtual network system according to an example of the present disclosure.

As shown in FIG. 2, the network configuration of the virtual node corresponding to the respective equipment nodes is described by a programming language. Finally, a virtual network system including the virtual nodes corresponding to the respective equipment nodes is constructed to generate the configuration file of the virtual network system. The configuration file may be a file in a jason (javascript object notation) format, and also be files in other formats, such as XML (Extensible Markup Language), Protobuf (Protocol Buffers, a data description language developed by Google, similar to XML, which can serialize structured data and can be used for data storage, communication protocols, and the like), Thrift (a software framework developed by Facebook, which enables systems developed in different languages to communicate through the framework), Avro (which is a data serialization system), and the like.

In order to ensure that the constructed virtual network system can realize all the design functions, the example of the present disclosure can also obtain the design functions to be realized by the wireless network system to be configured after constructing the virtual network system including the virtual nodes corresponding to the respective equipment nodes, and then simulate and test the virtual network system, such as simulating the control logic on site to determine whether the virtual network system can realize the design functions to be realized by the wireless network system to be configured, so that the debugging time on site can also be saved.

In an optional example of the present disclosure, the design function to be realized by the wireless network system to be configured includes the design function to be realized by the respective equipment nodes in the wireless network system to be configured, so that in a case where the virtual network system is simulated and tested, the respective virtual nodes in the virtual network system can be simulated and tested.

The above method for configuring the wireless network system is applied to the first terminal for offline configuration, such as a personal computer, a server, and the like, so that after the configuration file of the virtual network system is generated and stored, the configuration file can be downloaded to the second terminal (i.e., a configuration terminal as shown in FIG. 2), such as a smart phone, a tablet computer, a smart watch, and the like, used for configuration on site.

(2) Workflow of Offline Network Configuration

Firstly, according to the configuration file of the virtual network system, the display interface including the respective virtual nodes in the virtual network system is generated on the second terminal to be displayed to the user, so that in a case where a trigger operation of the user to the respective virtual nodes in the display interface is received, the network configuration parameters of the respective virtual nodes are extracted from the configuration file of the virtual network system by the second terminal, and are written into corresponding respective equipment nodes in the wireless network system to be configured to perform network configuration on the respective equipment nodes.

Figure 3:
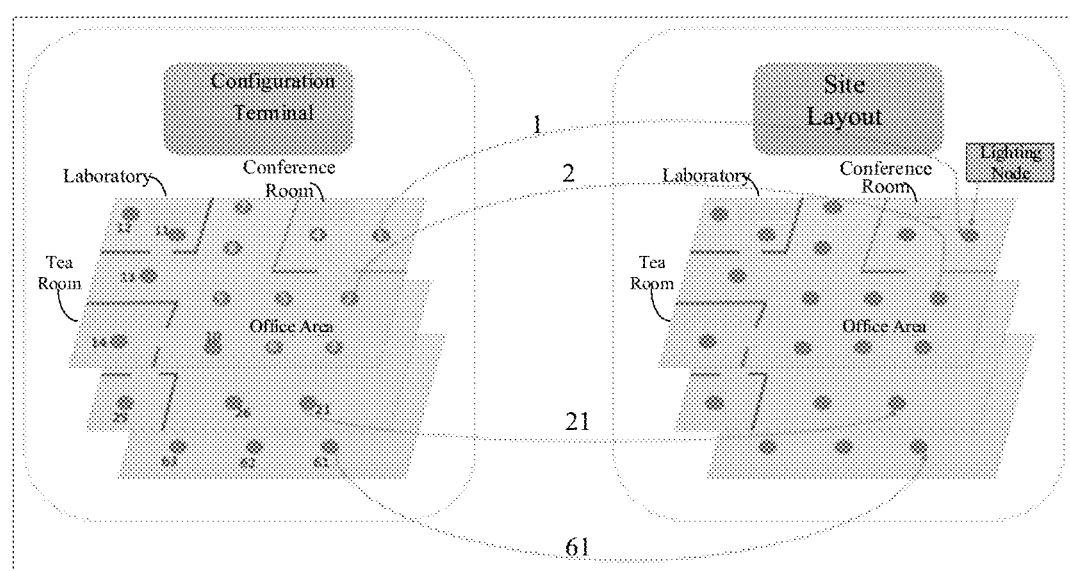
FIG. 3 shows a schematic diagram of performing network configuration offline by using a configuration file according to an example of the present disclosure.

FIG. 3 shows a schematic diagram of offline network configuration by using the configuration file of the virtual network system on the second terminal. In FIG. 3, three layers of display interfaces are provided, corresponding to different floors respectively. Node numbers on each layer of display interface represent virtual nodes one by one. A first layer of display interface includes virtual nodes 12 and 11 of a laboratory, virtual nodes 4 and 1 of a conference room, virtual node 14 of a tea room, virtual nodes 9, 5, 2, 10, 6 and 3 of an office area, and virtual nodes 7, 8 and 13 of other areas. Virtual nodes 29, 26 and 21 are included in a second layer of display interface. Virtual nodes 63, 62 and 61 are included in a third layer of display interface. Each layer of display interface can be flexibly switched. For example, the second layer of display interface is switched to the upper part of the first layer of display interface, and the third layer of display interface is switched to the upper part of the first layer of display interface, so that the installation personnel on site can conveniently search the virtual nodes.

The installation personnel on site can perform a triggering operation on a virtual node on the display interface, such as clicking, long pressing, sliding, and the like. At this time, the second terminal extracts the network configuration parameters of the virtual node corresponding to the triggering operation from the configuration file of the virtual network system. Then, the corresponding equipment node on site can be found through the installation location information in the network configuration parameters of the virtual node, and then the network configuration parameters of the virtual node are written into the equipment node. For example, the installation personnel on site can click on a virtual node 1 on the display interface. At this time, the second terminal extracts the network configuration parameters of the virtual node 1 from the configuration file of the virtual network system. A corresponding equipment node on site can be found through the installation location information in the network configuration parameters of the virtual node 1, and then the network configuration parameters of the virtual node are written into the equipment node.

As aforesaid, the respective equipment nodes in the wireless network system to be configured may be intelligent equipment, which may include the wireless communication module and the control module, the wireless communication module is used for receiving the external control signals, and the control module is used for controlling the turn-on of the intelligent equipment, the turn-off of the intelligent equipment and adjusting equipment parameters of the intelligent equipment according to the control signals received by the wireless communication module. Therefore, in the example of the present disclosure, in a case where the network configuration parameters of the respective virtual nodes in the virtual network system are written into corresponding respective equipment nodes in the wireless network system to be configured by the second terminal, the network configuration parameters of the respective virtual nodes in the virtual network system can be sent to the wireless communication module with a same protocol type on corresponding respective equipment nodes by a wireless communication module on the second terminal, so that the network configuration parameters of the respective virtual nodes in the virtual network system are written into the corresponding respective equipment nodes in the wireless network system to be configured. In this way, the respective equipment nodes can configure the wireless network system according to the network configuration parameters, and can test and debug the entire wireless network system.

After the configuration of the wireless network system is completed, control instructions or control signals can be sent to the respective equipment nodes by a remote controller or APP (application program). After a wireless communication module of an equipment node receives the control instructions or control signals, the control module determines whether to execute the control instructions according to the network configuration parameters on the equipment node. Specifically, the control module analyzes the control instructions or the control signals to obtain node numbers carried by the control instructions or the control signals, matches the analyzed node numbers with the node numbers in network configuration parameters of the equipment node, and determines to execute the control instructions in a case where the analyzed node numbers are matched with the node numbers in the network configuration parameters; and in a case where the analyzed node numbers are not matched with the node numbers in the network configuration parameters, the control module determines that the control instructions will not be executed.

In an optional example of the present disclosure, the wireless network system obtained by configuring in the example of the present disclosure may be a Bluetooth mesh (Ble mesh) system, which includes a plurality of equipment nodes. The outermost equipment node receives a Bluetooth signal sent from the outside, and determines whether to execute control instructions in the Bluetooth signal according to the network configuration parameters configured by nodes of the wireless network system. Moreover, after the equipment node receives the external Bluetooth signal, the equipment node will also transmit the received Bluetooth signal to other equipment nodes within a coverage range of the Bluetooth signal. In this way, other equipment nodes still determine whether to execute the control instructions in the Bluetooth signal according to the network configuration parameters configured by their own nodes after receiving the Bluetooth signal, and transmit the received Bluetooth signal to the equipment nodes within the coverage range of the Bluetooth signal, and so on.

It should be noted that in practical applications, all the above-mentioned optional examples can be combined in any combination to form optional examples of the present disclosure, which will not be repeated herein again.

Figure 4:
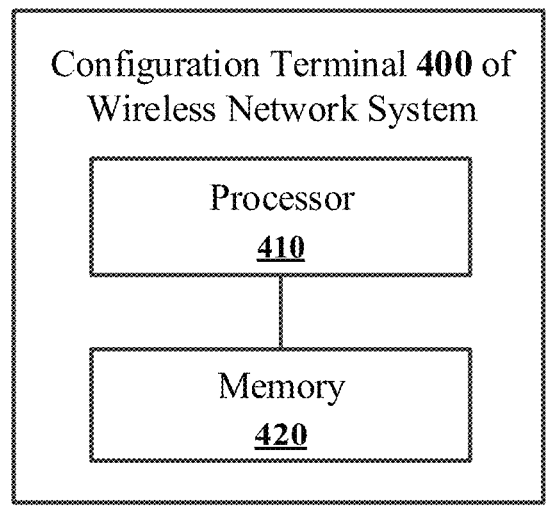
FIG. 4 shows a structural diagram of a configuration terminal of a wireless network system according to an example of the present disclosure.

Based on a same inventive concept, the example of the present disclosure also provides a configuration terminal of a wireless network system. FIG. 4 shows a structural diagram of a configuration terminal of a wireless network system according to an example of the present disclosure. As shown in FIG. 4, the configuration terminal 400 may include a processor 410 and a memory 420, the memory 420 stores a computer program, and the computer program is executed by the processor 410 to implement the following steps:

collecting relevant information of respective equipment nodes in a wireless network system to be configured;

determining network configuration parameters of virtual nodes corresponding to the respective equipment nodes based on the relevant information of the respective equipment nodes, and constructing a virtual network system comprising the virtual nodes corresponding to the respective equipment nodes; and performing a network configuration on the respective equipment nodes in the wireless network system to be configured by using the constructed virtual network system.

In an example of the present disclosure, when the computer program is executed by the processor 410, to further implement the following steps:

acquiring site layout drawings and installation location drawings of the respective equipment nodes in the wireless network system to be configured, and collecting the relevant information of the respective equipment nodes from the site layout drawings and the installation location drawings.

In an example of the present disclosure, the computer program is executed by the processor 410 to further implement the following steps:

determining functions to be realized by the respective equipment nodes in the wireless network system to be configured; and collecting the relevant information of the respective equipment nodes based on the functions to be realized by the respective equipment nodes.

In an example of the present disclosure, the relevant information comprises one or more of: site installation location information, location grouping information, location scene information, and working status information in different time periods.

In an example of the present disclosure, the computer program is executed by the processor 410 to further implement the following steps:

before determining the network configuration parameters of the virtual nodes corresponding to the respective equipment nodes based on the relevant information of the respective equipment nodes, assigning unique node numbers to the respective equipment nodes; and generating corresponding virtual nodes based on the node numbers of the respective equipment nodes.

In an example of the present disclosure, the computer program is executed by the processor 410 to further implement the following steps:

determining one or more fields of the network configuration parameters; and matching the one or more fields in the relevant information of the respective equipment nodes to obtain field values corresponding to respective fields, and further taking the respective fields and the field values corresponding to the respective fields as the network configuration parameters of the virtual nodes corresponding to the respective equipment nodes.

In an example of the present disclosure, the computer program is executed by the processor 410 to further implement the following steps:

after constructing the virtual network system comprising the virtual nodes corresponding to the respective equipment nodes, acquiring a design function to be realized by the wireless network system to be configured; and simulating and testing the virtual network system to determine whether the virtual network system can realize the design function to be realized by the wireless network system to be configured.

In an example of the present disclosure, the computer program is executed by the processor 410 to further implement the following steps:

the design function to be realized by the wireless network system to be configured comprising: design functions to be realized by the respective equipment nodes in the wireless network system to be configured; and simulating and testing respective virtual nodes in the virtual network system.

In an example of the present disclosure, the computer program is executed by the processor 410 to further implement the following steps:

storing a configuration file of the constructed virtual network system, and the configuration file of the virtual network system includes respective virtual nodes of the virtual network system and network configuration parameters of the respective virtual nodes; and extracting the network configuration parameters of the respective virtual nodes from the configuration file of the virtual network system, and writing the network configuration parameters into corresponding respective equipment nodes in the wireless network system to be configured to perform the network configuration on the respective equipment nodes.

In an example of the present disclosure, the computer program is executed by the processor 410 to further implement the following steps:

generating a display interface including the respective virtual nodes in the virtual network system, according to the configuration file of the virtual network system, for displaying to a user; and in a case where a trigger operation of the user for respective virtual nodes in the display interface is received, extracting the network configuration parameters of the respective virtual nodes from the configuration file of the virtual network system.

In an example of the present disclosure, the computer program is executed by the processor 410 to further implement the following steps:

by a wireless communication module, sending the network configuration parameters of the respective virtual nodes in the virtual network system to wireless communication modules with a same protocol type on corresponding respective equipment nodes, so that the network configuration parameters of the respective virtual nodes in the virtual network system are written into the corresponding respective equipment nodes in the wireless network system to be configured.

In an example of the present disclosure, the respective equipment nodes includes lighting devices.

Figure 5:
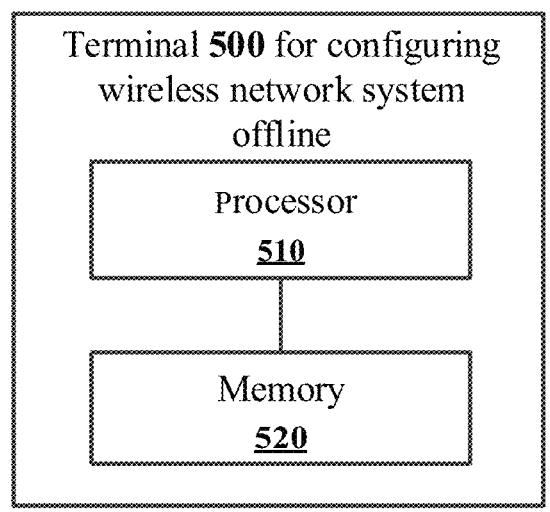
FIG. 5 shows a schematic structural diagram of a terminal for configuring a wireless network system offline according to an example of the present disclosure.

Based on the same inventive concept, the example of the present disclosure also provides a terminal for configuring a wireless network system offline. FIG. 5 shows a schematic structural diagram of a terminal for configuring a wireless network system offline according to an example of the present disclosure. As shown in FIG. 5, the terminal 500 for configuring a wireless network system offline may include a processor 510 and a memory 520, the memory 520 stores a computer program, and the computer program is executed by the processor 510 to implement the following steps:

collecting relevant information of respective equipment nodes in a wireless network system to be configured;

determining network configuration parameters of virtual nodes corresponding to the respective equipment nodes based on the relevant information of the respective equipment nodes, and constructing a virtual network system comprising the virtual nodes corresponding to the respective equipment nodes;

storing a configuration file of the constructed virtual network system, wherein the configuration file of the virtual network system comprises respective virtual nodes of the virtual network system and network configuration parameters of the respective virtual nodes; and sending the configuration file of the virtual network system to a terminal used for configuration on site, so that the terminal used for the configuration on site uses the configuration file of the virtual network system to perform the network configuration on the respective equipment nodes in the wireless network system to be configured.

In an example of the present disclosure, the computer program is executed by the processor 510 to implement the following steps:

acquiring site layout drawings and installation location drawings of the respective equipment nodes in the wireless network system to be configured, and collecting the relevant information of the respective equipment nodes from the site layout drawings and the installation location drawings; or determining functions to be realized by the respective equipment nodes in the wireless network system to be configured; and collecting the relevant information of the respective equipment nodes based on the functions to be realized by the respective equipment nodes.

In an example of the present disclosure, the computer program is executed by the processor 510 to implement the following steps:

before determining the network configuration parameters of the virtual nodes corresponding to the respective equipment nodes based on the relevant information of the respective equipment nodes, assigning unique node numbers to the respective equipment nodes; and generating corresponding virtual nodes based on the node numbers of the respective equipment nodes.

In an example of the present disclosure, the computer program is executed by the processor 510 to implement the following steps:

determining one or more fields of the network configuration parameters; and matching the one or more fields in the relevant information of the respective equipment nodes to obtain field values corresponding to respective fields, and further taking the respective fields and the field values corresponding to the respective fields as the network configuration parameters of the virtual nodes corresponding to the respective equipment nodes.

In an example of the present disclosure, the computer program is executed by the processor 510 to implement the following steps:

after constructing the virtual network system including the virtual nodes corresponding to the respective equipment nodes, acquiring a design function to be realized by the wireless network system to be configured; and simulating and testing the virtual network system to determine whether the virtual network system can realize the design function to be realized by the wireless network system to be configured.

In an example of the present disclosure, the computer program is executed by the processor 510 to implement the following steps:

the design function to be realized by the wireless network system to be configured comprising: design functions to be realized by the respective equipment nodes in the wireless network system to be configured; and simulating and testing respective virtual nodes in the virtual network system.

Figure 6:
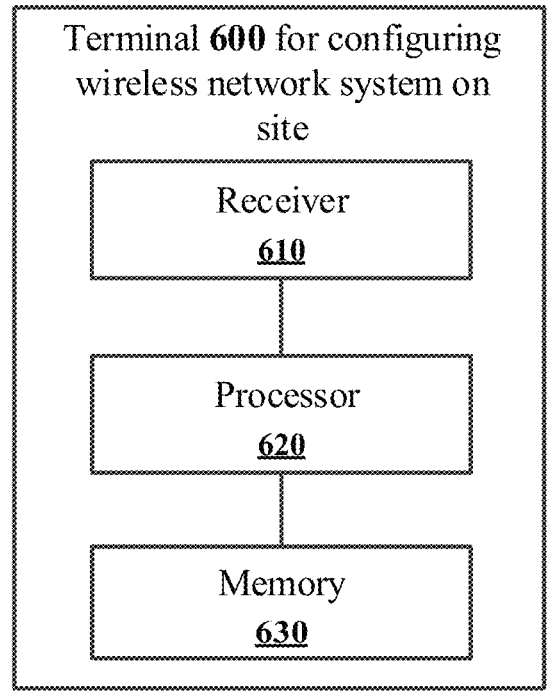
FIG. 6 shows a schematic structural diagram of a terminal for configuring a wireless network system on site according to an example of the present disclosure.

Correspondingly, the example of the present disclosure also provides a terminal for configuring a wireless network system on site. FIG. 6 shows a schematic structural diagram of a terminal for configuring a wireless network system on site according to an example of the present disclosure. As shown in FIG. 6, the terminal 600 for configuring the wireless network system on site may include a receiver 610, a processor 620, and a memory 630. The receiver 610 is configured to receive the configuration file of the virtual network system transmitted from the terminal 500 for configuring the wireless network system offline; and the memory 630 stores a computer program, and the computer program is executed by the processor 620 to implement the following steps:

performing a network configuration on the respective equipment nodes in the wireless network system to be configured by using the configuration file of the virtual network system.

In an example of the present disclosure, the computer program is executed by the processor 620 to implement the following steps:

extracting network configuration parameters of respective virtual nodes from the configuration file of the virtual network system, and writing the network configuration parameters into corresponding respective equipment nodes in the wireless network system to be configured to perform the network configuration on the respective equipment nodes.

In an example of the present disclosure, the computer program is executed by the processor 620 to implement the following steps:

generating a display interface including the respective virtual nodes in the virtual network system, according to the configuration file of the virtual network system, for displaying to a user; and in a case where a trigger operation of the user for respective virtual nodes in the display interface is received, extracting the network configuration parameters of the respective virtual nodes from the configuration file of the virtual network system.

In an example of the present disclosure, by a wireless communication module of the terminal, sending the network configuration parameters of the respective virtual nodes in the virtual network system to wireless communication modules with a same protocol type on corresponding respective equipment nodes, so that the network configuration parameters of the respective virtual nodes in the virtual network system are written into the corresponding respective equipment nodes in the wireless network system to be configured.

Figure 7:
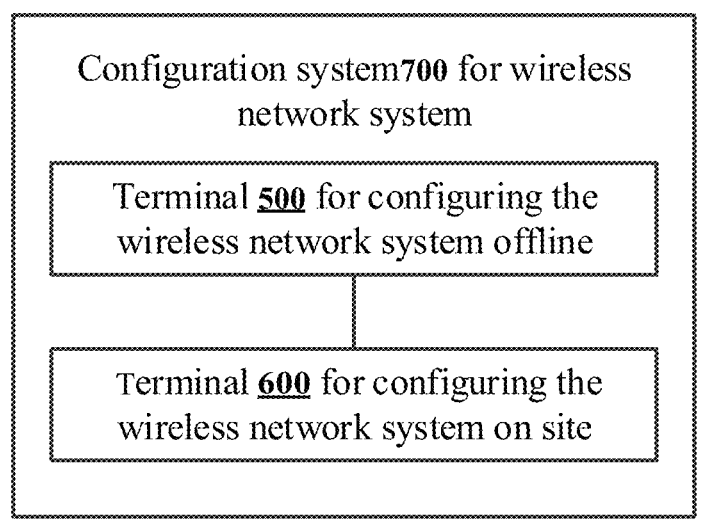
FIG. 7 shows a structural diagram of a configuration system of a wireless network system according to an example of the present disclosure.

Based on the same inventive concept, the example of the present disclosure also provides a configuration system of a wireless network system. FIG. 7 shows a structural diagram of a configuration system of a wireless network system according to an example of the present disclosure. As shown in FIG. 7, the configuration system 700 may include the terminal 500 for configuring the wireless network system offline as shown in FIG. 5 in the above and the terminal 600 for configuring the wireless network system on site as shown in FIG. 6 in the above.

According to any one of the above examples or a combination of the plurality of examples, the example of the present disclosure can achieve the beneficial effects as follows.

In the example of the present disclosure, firstly, the relevant information of the respective equipment nodes in the wireless network system to be configured is collected; then, based on the relevant information of the respective equipment nodes, the network configuration parameters of the virtual nodes corresponding to the respective equipment nodes are determined, and the virtual network system including the virtual nodes corresponding to the respective equipment nodes is constructed; after that, the virtual network system, which is constructed, is used to perform the network configuration on the respective equipment nodes in the wireless network system to be configured. Thus, it can be seen that the example of the present disclosure performs the network configuration on the respective equipment nodes in the wireless network system to be configured by constructing the virtual network system. Because the constructed virtual network system includes the virtual nodes corresponding to the respective equipment nodes and the respective virtual nodes is defined with the network configuration parameters, in the configuration process on site, each equipment node is corresponding to a corresponding virtual node, and the network configuration parameters of the virtual node are written to the equipment node, thus completing network configuration on an entire wireless network system. Thus, on one hand, the efficiency of configuring nodes on site is improved, and the problem of low efficiency caused by the fact, that the installation personnel need to manually configure and debug nodes on site according to the design drawings of the wireless system and the detailed configuration drawings of the wireless system in other implementations, is solved; and on the other hand, the requirements on the skills of the installation personnel can be reduce and the operability is strong.

Further, the example of the present disclosure can also generate the display interface including the respective virtual nodes in the virtual network system according to the configuration file of the virtual network system to display to the user, so as to extract the network configuration parameters of the respective virtual nodes from the configuration file of the virtual network system in a case where the trigger operation of the user for the respective virtual nodes in the display interface is received. As can be seen, the display interface generated by the example of the present disclosure can more intuitively and clearly display the respective virtual nodes and parameter information thereof, so that installation personnel can quickly acquire the virtual nodes corresponding to the respective equipment nodes on site and write the network configuration parameters of the virtual nodes into the equipment nodes, thereby completing the network configuration of the entire wireless network system and further improving the efficiency of configuring the node on site.

The present disclosure is proposed to provide a configuration method, a configuration terminal, and a configuration system of a wireless network system.

According to an aspect of the present disclosure, a method for configuring a wireless network system is provided, which includes: collecting relevant information of respective equipment nodes in a wireless network system to be configured; determining network configuration parameters of virtual nodes corresponding to the respective equipment nodes based on the relevant information of the respective equipment nodes, and constructing a virtual network system comprising the virtual nodes corresponding to the respective equipment nodes; and performing a network configuration on the respective equipment nodes in the wireless network system to be configured by using the constructed virtual network system.

Optionally, collecting the relevant information of the respective equipment nodes in the wireless network system to be configured includes: acquiring site layout plans and installation location drawings of the respective equipment nodes in the wireless network system to be configured, and collecting the relevant information of the respective equipment nodes from the site layout plans and the installation location drawings.

Optionally, collecting the relevant information of the respective equipment nodes in the wireless network system to be configured includes: determining functions to be realized by the respective equipment nodes in the wireless network system to be configured; and collecting the relevant information of the respective equipment nodes based on the functions to be realized by the respective equipment nodes.

Optionally, the relevant information includes one or more of the following: site installation location information, location grouping information, location scene information, and working status information in different time periods.

Optionally, before determining the network configuration parameters of the virtual nodes corresponding to the respective equipment nodes based on the relevant information of the respective equipment nodes, the method further includes: assigning unique node numbers to the respective equipment nodes; and generating corresponding virtual nodes based on the node numbers of the respective equipment nodes.

Optionally, determining the network configuration parameters of the virtual nodes corresponding to the respective equipment nodes based on the relevant information of the respective equipment nodes includes: determining one or more fields of the network configuration parameters; and matching the one or more fields in the relevant information of the respective equipment nodes to obtain field values corresponding to respective fields, and further taking the respective fields and the field values corresponding to the respective fields as the network configuration parameters of the virtual nodes corresponding to the respective equipment nodes.

Optionally, after constructing the virtual network system comprising the virtual nodes corresponding to the respective equipment nodes, the method further includes: acquiring a design function to be realized by the wireless network system to be configured; and simulating and testing the virtual network system to determine whether the virtual network system can realize the design function to be realized by the wireless network system to be configured.

Optionally, the design function to be realized by the wireless network system to be configured includes: design functions to be realized by the respective equipment nodes in the wireless network system to be configured; and simulating and testing the virtual network system includes: simulating and testing respective virtual nodes in the virtual network system.

Optionally, performing the network configuration on the respective equipment nodes in the wireless network system to be configured by using the virtual network system, which is constructed, includes: storing a configuration file of the constructed virtual network system, wherein the configuration file of the virtual network system comprises respective virtual nodes of the virtual network system and network configuration parameters of the respective virtual nodes; and extracting the network configuration parameters of the respective virtual nodes from the configuration file of the virtual network system, and writing the network configuration parameters into corresponding respective equipment nodes in the wireless network system to be configured to perform the network configuration on the respective equipment nodes.

Optionally, extracting the network configuration parameters of the respective virtual nodes from the configuration file of the virtual network system includes: generating a display interface comprising the respective virtual nodes in the virtual network system, according to the configuration file of the virtual network system, for displaying to a user; and in a case where a trigger operation of the user for respective virtual nodes in the display interface is received, extracting the network configuration parameters of the respective virtual nodes from the configuration file of the virtual network system.

Optionally, extracting the network configuration parameters of the respective virtual nodes from the configuration file of the virtual network system, and writing the network configuration parameters into the corresponding respective equipment nodes in the wireless network system to be configured to perform the network configuration on the respective equipment nodes includes: by a wireless communication module, sending the network configuration parameters of the respective virtual nodes in the virtual network system to wireless communication modules with a same protocol type on corresponding respective equipment nodes, so that the network configuration parameters of the respective virtual nodes in the virtual network system are written into the corresponding respective equipment nodes in the wireless network system to be configured.

Optionally, the method is applied to a first terminal used for offline configuration, and performing the network configuration on the respective equipment nodes in the wireless network system to be configured by using the constructed virtual network system includes: storing a configuration file of the constructed virtual network system, on the first terminal, wherein the configuration file of the virtual network system comprises respective virtual nodes of the virtual network system and network configuration parameters of the respective virtual nodes; and sending the configuration file of the virtual network system, by the first terminal, to a second terminal used for configuration on site, so that the second terminal uses the configuration file of the virtual network system to perform the network configuration on the respective equipment nodes in the wireless network system to be configured.

Optionally, the second terminal uses the configuration file of the virtual network system to perform the network configuration on the respective equipment nodes in the wireless network system to be configured includes: by the second terminal, extracting the network configuration parameters of the respective virtual nodes from the configuration file of the virtual network system, and writing the network configuration parameters into corresponding respective equipment nodes in the wireless network system to be configured, so as to perform the network configuration on the respective equipment nodes.

Optionally, extracting the network configuration parameters of the respective virtual nodes from the configuration file of the virtual network system by the second terminal includes: according to the configuration file of the virtual network system, generating a display interface comprising the respective virtual nodes in the virtual network system on the second terminal for displaying to a user; and in a case where a trigger operation of the user for respective virtual nodes in the display interface is received, extracting the network configuration parameters of the respective virtual nodes, by the second terminal, from the configuration file of the virtual network system.

Optionally, writing the network configuration parameters of the respective virtual nodes of the virtual network system, by the second terminal, into the corresponding respective equipment nodes in the wireless network system to be configured includes: by a wireless communication module on the second terminal, sending the network configuration parameters of the respective virtual nodes in the virtual network system to wireless communication modules with a same protocol type on corresponding respective equipment nodes, so that the network configuration parameters of the respective virtual nodes in the virtual network system are written into the corresponding respective equipment nodes in the wireless network system to be configured.

Optionally, the respective equipment nodes comprise lighting devices.

According to another aspect of the present disclosure, a configuration terminal of a wireless network system is also provided, which includes a processor and a memory. The memory is configured to store programs for executing the above-mentioned configuration method of the wireless network system, and the processor is configured to execute the programs stored in the memory.

According to yet another aspect of the present disclosure, a terminal for configuring a wireless network system offline is also provided, which includes a processor; and a memory, on which a computer program is stored, when the computer program is executed by the processor, the following steps are performed: collecting relevant information of respective equipment nodes in a wireless network system to be configured; determining network configuration parameters of virtual nodes corresponding to the respective equipment nodes based on the relevant information of the respective equipment nodes, and constructing a virtual network system comprising the virtual nodes corresponding to the respective equipment nodes; storing a configuration file of the constructed virtual network system, wherein the configuration file of the virtual network system comprises respective virtual nodes of the virtual network system and network configuration parameters of the respective virtual nodes; and sending the configuration file of the virtual network system to a terminal used for configuration on site, so that the terminal used for the configuration on site uses the configuration file of the virtual network system to perform the network configuration on the respective equipment nodes in the wireless network system to be configured.

Optionally, the computer program is executed by the processor to further implement the following steps: acquiring site layout plans and installation location drawings of the respective equipment nodes in the wireless network system to be configured, and collecting the relevant information of the respective equipment nodes from the site layout plans and the installation location drawings; or determining functions to be realized by the respective equipment nodes in the wireless network system to be configured; and collecting the relevant information of the respective equipment nodes based on the functions to be realized by the respective equipment nodes.

Optionally, when the computer program is executed by the processor the following steps are further implement: before determining the network configuration parameters of the virtual nodes corresponding to the respective equipment nodes based on the relevant information of the respective equipment nodes, assigning unique node numbers to the respective equipment nodes; and generating corresponding virtual nodes based on the node numbers of the respective equipment nodes.

Optionally, when the computer program is executed by the processor, the following steps are further implement: determining one or more fields of the network configuration parameters; and matching the one or more fields in the relevant information of the respective equipment nodes to obtain field values corresponding to respective fields, and further taking the respective fields and the field values corresponding to the respective fields as the network configuration parameters of the virtual nodes corresponding to the respective equipment nodes.

Optionally, when the computer program is executed by the processor, the following steps are further implement: after constructing the virtual network system comprising the virtual nodes corresponding to the respective equipment nodes, acquiring a design function to be realized by the wireless network system to be configured; and simulating and testing the virtual network system to determine whether the virtual network system can realize the design function to be realized by the wireless network system to be configured.

Optionally, when the computer program is executed by the processor, the following steps are further implement: the design function to be realized by the wireless network system to be configured including: design functions to be realized by the respective equipment nodes in the wireless network system to be configured; and simulating and testing respective virtual nodes in the virtual network system.

According to yet another aspect of the present disclosure, a terminal for configuring a wireless network system on site is also provided, which includes: a receiver, configured to receive the configuration file of the virtual network system transmitted from the above-mentioned terminal for configuring the wireless network system offline; a processor; and a memory, on which a computer program is stored, and the computer program is executed by the processor to implement the following steps: performing a network configuration on the respective equipment nodes in the wireless network system to be configured by using the configuration file of the virtual network system.

Optionally, when the computer program is executed by the processor, the following steps are further implement: extracting network configuration parameters of respective virtual nodes from the configuration file of the virtual network system, and writing the network configuration parameters into corresponding respective equipment nodes in the wireless network system to be configured to perform the network configuration on the respective equipment nodes.

Optionally, when the computer program is executed by the processor, the following steps are further implement: generating a display interface comprising the respective virtual nodes in the virtual network system, according to the configuration file of the virtual network system, for displaying to a user; and in a case where a trigger operation of the user for respective virtual nodes in the display interface is received, extracting the network configuration parameters of the respective virtual nodes from the configuration file of the virtual network system.

Optionally, when the computer program is executed by the processor, the following steps are further implement: by a wireless communication module of the terminal, sending the network configuration parameters of the respective virtual nodes in the virtual network system to wireless communication modules with a same protocol type on corresponding respective equipment nodes, so that the network configuration parameters of the respective virtual nodes in the virtual network system are written into the corresponding respective equipment nodes in the wireless network system to be configured.

According to still another aspect of the present disclosure, a configuration system for a wireless network system is also provided, which includes: the terminal for configuring the wireless network system offline according to any one of the above, and the terminal for configuring the wireless network system on site according to any one of the above.

In examples of the present disclosure, firstly, the relevant information of the respective equipment nodes in the wireless network system to be configured is collected; then, based on the relevant information of the respective equipment nodes, the network configuration parameters of the virtual nodes corresponding to the respective equipment nodes are determined, and the virtual network system including the virtual nodes corresponding to the respective equipment nodes is constructed; after that, the virtual network system, which is constructed, is used to perform the network configuration on the respective equipment nodes in the wireless network system to be configured.

Thus, it can be seen that the example of the present disclosure performs the network configuration on the respective equipment nodes in the wireless network system to be configured by constructing the virtual network system. Because the constructed virtual network system includes the virtual nodes corresponding to the respective equipment nodes and the respective virtual nodes is defined with the network configuration parameters, in the configuration process on site, each equipment node is corresponding to a corresponding virtual node, and the network configuration parameters of the virtual node are written to the equipment node, thus completing network configuration on an entire wireless network system. Thus, on one hand, the efficiency of configuring nodes on site is improved, and the problem of low efficiency caused by the fact, that the installation personnel need to manually configure and debug nodes on site according to the design drawings of the wireless system and the detailed configuration drawings of the wireless system in other implementations, is solved; and on the other hand, the requirements on the skills of the installation personnel can be reduce and the operability is strong.

Further, the example of the present disclosure can also generate the display interface including the respective virtual nodes in the virtual network system according to the configuration file of the virtual network system to display to the user, so as to extract the network configuration parameters of the respective virtual nodes from the configuration file of the virtual network system in a case where the trigger operation of the user for the respective virtual nodes in the display interface is received. As can be seen, the display interface generated by the example of the present disclosure can more intuitively and clearly display the respective virtual nodes and parameter information thereof, so that installation personnel can quickly acquire the virtual nodes corresponding to the respective equipment nodes on site and write the network configuration parameters of the virtual nodes into the equipment nodes, thereby completing the network configuration of the entire wireless network system and further improving the efficiency of configuring the node on site.

The above description is only an overview of the technical solution of the present disclosure. In order to better understand the technical means of the present disclosure, it can be implemented according to the contents of the specification. In order to make the above and other objects, features and advantages of the present disclosure more obvious and understandable, the following is an example of the present disclosure.

The above and other objects, advantages and features of the present disclosure will become more apparent to those skilled in the art according to the following detailed description of examples of the present disclosure taken in conjunction with the accompanying drawings.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The specific examples described above further describes the purpose, technical solution and beneficial effects of the present disclosure in detail. It should be understood that the above is only an example of the present disclosure and is not intended to limit the present disclosure. Any modification, equivalent substitution, improvement, and the like made within the spirit and principles of the present disclosure should be included in the scope of protection of the present disclosure.

What is claimed is:

1. A method for configuring a wireless network system, comprising:
collecting relevant information of respective equipment nodes in the wireless network system to be configured;
determining network configuration parameters of virtual nodes corresponding to the respective equipment nodes based on the relevant information of the respective equipment nodes, and constructing a virtual network system comprising the virtual nodes corresponding to the respective equipment nodes;
acquiring a design function to be realized by the wireless network system to be configured;
simulating and testing the virtual network system to determine whether the virtual network system can realize the design function to be realized by the wireless network system to be configured; and
performing a network configuration on the respective equipment nodes in the wireless network system to be configured by using the constructed virtual network system.

2. The method according to claim 1, wherein collecting the relevant information of the respective equipment nodes in the wireless network system to be configured comprises:
acquiring site layout drawings and installation location drawings of the respective equipment nodes in the wireless network system to be configured, and collecting the relevant information of the respective equipment nodes from the site layout drawings and the installation location drawings.

3. The method according to claim 1, wherein collecting the relevant information of the respective equipment nodes in the wireless network system to be configured comprises:
determining functions to be realized by the respective equipment nodes in the wireless network system to be configured; and
collecting the relevant information of the respective equipment nodes based on the functions to be realized by the respective equipment nodes.

4. The method according to claim 1, wherein the relevant information comprises one or more of:
site installation location information, location grouping information, location scene information, and working status information in different time periods.

5. The method according to claim 1, before determining the network configuration parameters of the virtual nodes corresponding to the respective equipment nodes based on the relevant information of the respective equipment nodes, further comprising:

assigning unique node numbers to the respective equipment nodes; and generating corresponding virtual nodes based on the node numbers of the respective equipment nodes.

6. The method according to claim 5, wherein determining the network configuration parameters of the virtual nodes corresponding to the respective equipment nodes based on the relevant information of the respective equipment nodes comprises:

determining one or more fields of the network configuration parameters; and matching the one or more fields in the relevant information of the respective equipment nodes to obtain field values corresponding to respective fields, and taking the respective fields and the field values corresponding to the respective fields as the network configuration parameters of the virtual nodes corresponding to the respective equipment nodes.

7. The method according to claim 1, wherein:

the design function to be realized by the wireless network system to be configured comprises: design functions to be realized by the respective equipment nodes in the wireless network system to be configured; and simulating and testing the virtual network system further comprises: simulating and testing respective virtual nodes in the virtual network system.

8. The method according to claim 1, wherein performing the network configuration on the respective equipment nodes in the wireless network system to be configured by using the constructed virtual network system comprises:

storing a configuration file of the constructed virtual network system, wherein the configuration file of the virtual network system comprises respective virtual nodes of the virtual network system and network configuration parameters of the respective virtual nodes; and extracting the network configuration parameters of the respective virtual nodes from the configuration file of the virtual network system, and writing the network configuration parameters into corresponding respective equipment nodes in the wireless network system to be configured to perform the network configuration on the respective equipment nodes.

9. The method according to claim 8, wherein extracting the network configuration parameters of the respective virtual nodes from the configuration file of the virtual network system comprises:

generating a display interface comprising the respective virtual nodes in the virtual network system, according to the configuration file of the virtual network system, for displaying to a user; and in a case where a trigger operation of the user for respective virtual nodes in the display interface is received, extracting the network configuration parameters of the respective virtual nodes from the configuration file of the virtual network system.

10. The method according to claim 8, wherein extracting the network configuration parameters of the respective virtual nodes from the configuration file of the virtual network system, and writing the network configuration parameters into the corresponding respective equipment nodes in the wireless network system to be configured to perform the network configuration on the respective equipment nodes comprises:

by a wireless communicator, sending the network configuration parameters of the respective virtual nodes in the virtual network system to wireless communicators with a same protocol type on corresponding respective equipment nodes, so that the network configuration parameters of the respective virtual nodes in the virtual network system are written into the corresponding respective equipment nodes in the wireless network system to be configured.

11. The method according to claim 1, applied to a first terminal used for offline configuration, wherein performing the network configuration on the respective equipment nodes in the wireless network system to be configured by using the constructed virtual network system comprises:

storing a configuration file of the constructed virtual network system, on the first terminal, wherein the configuration file of the virtual network system comprises respective virtual nodes of the virtual network system and network configuration parameters of the respective virtual nodes; and sending the configuration file of the virtual network system, by the first terminal, to a second terminal used for configuration on site, so that using, by the second terminal, the configuration file of the virtual network system to perform the network configuration on the respective equipment nodes in the wireless network system to be configured.

12. The method according to claim 11, wherein using, by the second terminal, the configuration file of the virtual network system to perform the network configuration on the respective equipment nodes in the wireless network system to be configured comprises:

extracting, by the second terminal, the network configuration parameters of the respective virtual nodes from the configuration file of the virtual network system, and writing the network configuration parameters into corresponding respective equipment nodes in the wireless network system to be configured, so as to perform the network configuration on the respective equipment nodes.

13. The method according to claim 12, wherein extracting the network configuration parameters of the respective virtual nodes from the configuration file of the virtual network system by the second terminal comprises:

according to the configuration file of the virtual network system, generating a display interface comprising the respective virtual nodes in the virtual network system on the second terminal for displaying to a user; and in a case where a trigger operation of the user for respective virtual nodes in the display interface is received, extracting the network configuration parameters of the respective virtual nodes, by the second terminal, from the configuration file of the virtual network system.

14. The method according to claim 12, wherein writing the network configuration parameters of the respective virtual nodes of the virtual network system, by the second terminal, into the corresponding respective equipment nodes in the wireless network system to be configured comprises:

by a wireless communicator on the second terminal, sending the network configuration parameters of the respective virtual nodes in the virtual network system to wireless communicators with a same protocol type on corresponding respective equipment nodes, so that the network configuration parameters of the respective virtual nodes in the virtual network system are written into the corresponding respective equipment nodes in the wireless network system to be configured.

15. The method according to claim 1, wherein the respective equipment nodes include lighting devices.

16. A terminal for configuring a wireless network system offline, comprising:
a processor; and
a memory, on which a computer program is stored and is executable by the processor, wherein the computer program, when is executed, causes the processor to perform:
collecting relevant information of respective equipment nodes in a wireless network system to be configured;
determining network configuration parameters of virtual nodes corresponding to the respective equipment nodes based on the relevant information of the respective equipment nodes, and constructing a virtual network system comprising the virtual nodes corresponding to the respective equipment nodes;
storing a configuration file of the constructed virtual network system, wherein the configuration file of the virtual network system comprises respective virtual nodes of the virtual network system and network configuration parameters of the respective virtual nodes; and
sending the configuration file of the virtual network system to a terminal used for configuration on site, so that the terminal used for the configuration on site uses the configuration file of the virtual network system to perform the network configuration on the respective equipment nodes in the wireless network system to be configured.

17. The terminal according to claim 16, wherein the computer program further causes the processor to perform:
acquiring site layout drawings and installation location drawings of the respective equipment nodes in the wireless network system to be configured, and collecting the relevant information of the respective equipment nodes from the site layout drawings and the installation location drawings; or
determining functions to be realized by the respective equipment nodes in the wireless network system to be configured; and
collecting the relevant information of the respective equipment nodes based on the functions to be realized by the respective equipment nodes.

18. A terminal for configuring a wireless network system on site, comprising:
a receiver, configured to receive a configuration file of a virtual network system transmitted from a terminal for configuring a wireless network system offline comprising an offline terminal processor; and an offline terminal memory, on which an offline terminal computer program is stored and is executable by the offline terminal processor; and wherein the offline terminal computer program, when is executed, causes the offline terminal processor to perform:
collecting relevant information of respective equipment nodes in the wireless network system to be configured;
determining network configuration parameters of virtual nodes corresponding to the respective equipment nodes based on the relevant information of the respective equipment nodes, and constructing the virtual network system comprising the virtual nodes corresponding to the respective equipment nodes;
storing the configuration file of the constructed virtual network system, wherein the configuration file of the virtual network system comprises respective virtual nodes of the virtual network system and network configuration parameters of the respective virtual nodes; and
sending the configuration file of the virtual network system to a terminal used for configuration on site, so that the terminal used for the configuration on site uses the configuration file of the virtual network system to perform the network configuration on the respective equipment nodes in the wireless network system to be configured; and
a processor; and a memory, on which a computer program is stored, wherein the computer program, when is executed, causes the processor to perform: performing a network configuration on the respective equipment nodes in the wireless network system to be configured by using the configuration file of the virtual network system.

19. The terminal for configuring the wireless network system on site according to claim 18, wherein the computer program further causes the processor to perform:
extracting network configuration parameters of respective virtual nodes from the configuration file of the virtual network system, and writing the network configuration parameters into corresponding respective equipment nodes in the wireless network system to be configured to perform the network configuration on the respective equipment nodes.

* * * * *